United States Patent [19]

Jutte

[11] Patent Number: 5,756,179
[45] Date of Patent: May 26, 1998

[54] INSULATING MODULAR PANELS INCORPORATING VACUUM INSULATION PANELS

[75] Inventor: Ralph B. Jutte, Hebron, Ohio

[73] Assignee: Owens Corning Fiberglas Technology, Inc., Summit, Ill.

[21] Appl. No.: 560,859

[22] Filed: Apr. 1, 1996

Related U.S. Application Data

[62] Division of Ser. No. 414,691, Mar. 31, 1995, Pat. No. 5,527,411.

[51] Int. Cl.$^6$ .................. B32B 1/04; B32B 1/06
[52] U.S. Cl. .................. 428/69; 428/58; 428/60; 156/213
[58] Field of Search .................. 428/69; 156/204, 156/213, 216, 269

[56] References Cited

U.S. PATENT DOCUMENTS

| | | | |
|---|---|---|---|
| 1,239,770 | 9/1917 | Colman | 428/68 |
| 2,067,015 | 1/1937 | Munters | 428/69 |
| 2,745,173 | 5/1956 | Janos | 428/74 |
| 2,768,046 | 10/1956 | Evans | 312/214 |
| 3,004,877 | 10/1961 | Simms et al. | 428/74 |
| 3,179,549 | 4/1965 | Strong et al. | 428/74 |
| 3,736,210 | 5/1973 | Kaczerginski | 156/431 |
| 3,933,549 | 1/1976 | Heimann et al. | 156/79 |
| 4,359,496 | 11/1982 | Kratel et al. | 428/75 |
| 4,444,821 | 4/1984 | Young et al. | 428/69 |
| 4,463,043 | 7/1984 | Reeves et al. | 428/68 |
| 4,486,482 | 12/1984 | Kahayaski et al. | 428/69 |
| 4,513,041 | 4/1985 | Delluc | 428/69 |
| 4,557,091 | 12/1985 | Auer | 52/282 |
| 4,605,254 | 8/1986 | Carmien | 294/57 |
| 4,668,551 | 5/1987 | Kawasaki et al. | 428/69 |
| 4,669,632 | 6/1987 | Kawasaki et al. | 220/423 |
| 4,726,974 | 2/1988 | Nowobilski et al. | 428/69 |
| 4,878,258 | 11/1989 | Casey | 5/420 |
| 5,082,335 | 1/1992 | Cur et al. | 312/401 |
| 5,090,981 | 2/1992 | Rusek, Jr. | 65/4.4 |
| 5,094,899 | 3/1992 | Rusek, Jr. | 428/69 |
| 5,273,801 | 12/1993 | Barry et al. | 428/69 |

FOREIGN PATENT DOCUMENTS

| | | |
|---|---|---|
| A434225 | 6/1991 | European Pat. Off. . |
| 604100A | 6/1994 | European Pat. Off. . |
| 9102856 | 3/1991 | WIPO . |

*Primary Examiner*—Alexander Thomas
*Attorney, Agent, or Firm*—C. Michael Gegenheimer; Curtis B. Brueske

[57] ABSTRACT

Improved insulating modular panels are manufactured to incorporate into each insulating modular panel at least one vacuum insulation panel. Vacuum insulation panels are conveyed seriatim toward a pultrusion die which ultimately produces the insulating modular panels as a continuous block. Joint spacings or gaps between adjacent vacuum insulation panels and sides of the vacuum panels are filled with foam or preformed filler material to form a substantially continuous inner core which has substantially continuous side edges. Reinforcement material is applied to the inner core. The reinforcement material can be impregnated with resin prior to its application to the inner core or resin may be injected into the pultrusion die. In either event, a continuous elongated block of insulating modular panels emerges from the pultrusion die. The continuous elongated block is severed at joint spacings or gaps between adjacent vacuum insulation panels to form insulating modular panels of desired sizes from the block. Preferably, the sides of the insulating modular panels are formed to define intermating members which engage one another to facilitate construction using the insulating modular panels.

10 Claims, 9 Drawing Sheets

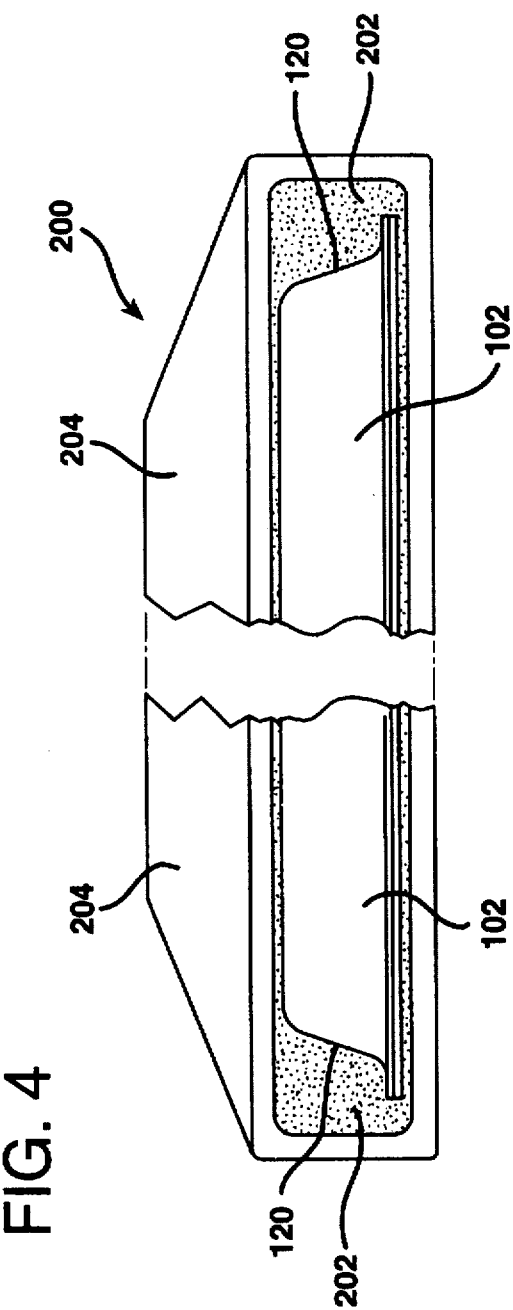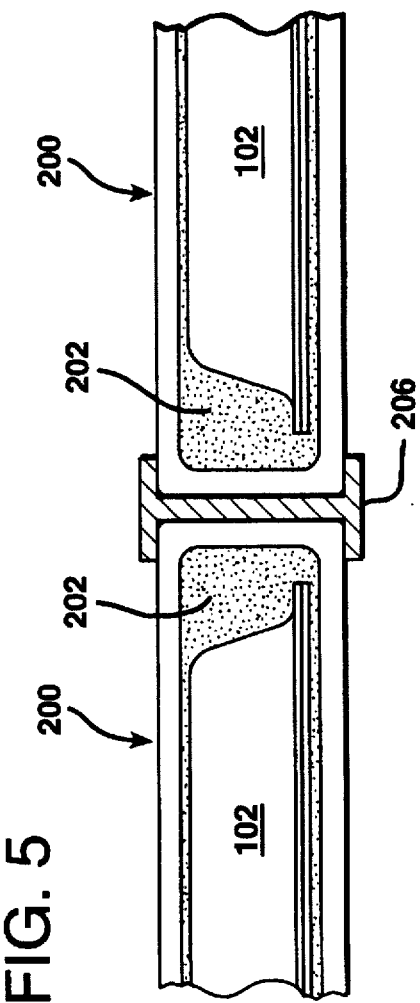
FIG. 4
FIG. 5

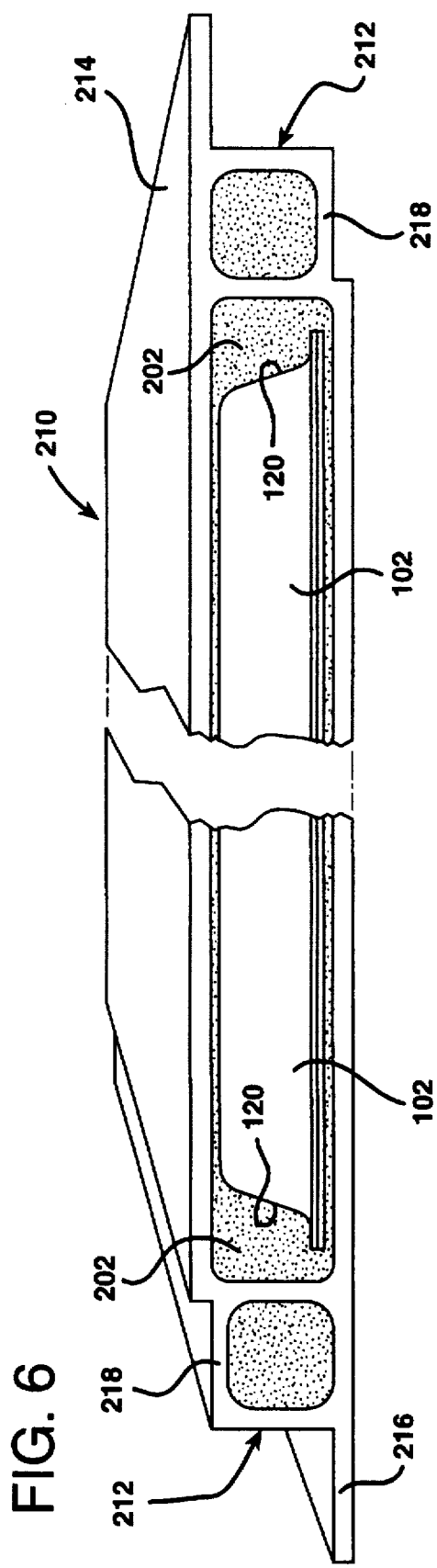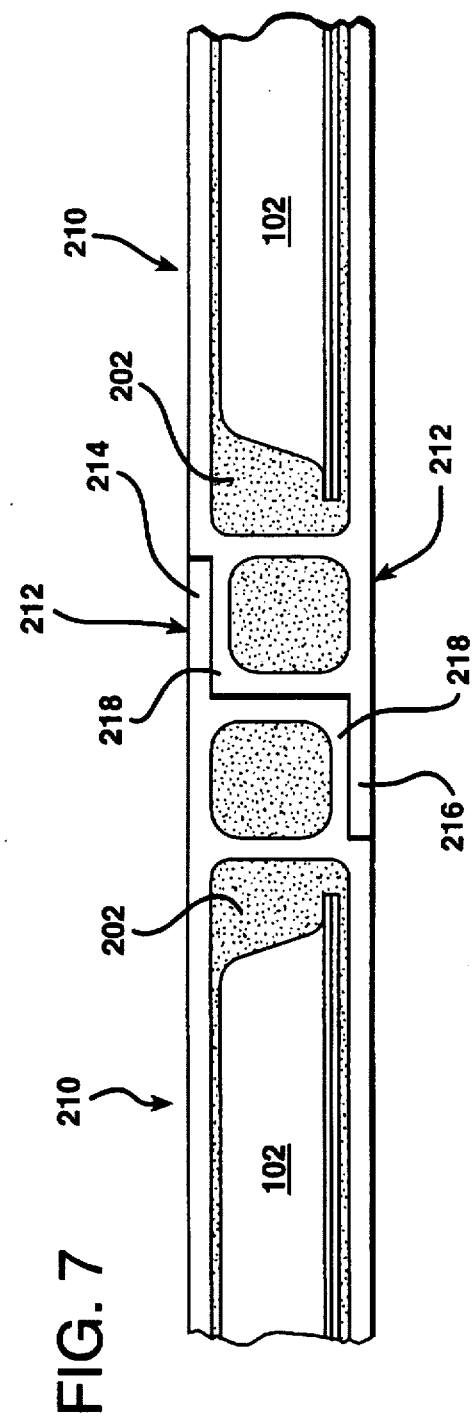

INSULATING MODULAR PANELS INCORPORATING VACUUM INSULATION PANELS

This application is a divisional of Ser. No. 08/414,691, filed Mar. 31, 1995, now U.S. Pat. No. 5,527,411.

BACKGROUND OF THE INVENTION

The present invention relates in general to insulating modular panels which can be used directly in constructing insulated structures and, more particularly, to improved insulating modular panels incorporating vacuum insulation panels therein and methods of making such panels.

Construction or building panels produced using pultrusion or extrusion of fiber reinforced plastic are well known in the building industry. The fiber reinforced plastic provides good durability, strength and surface properties required of a structural panel. To provide higher insulation from such panels, they have been formed to include an inner core of material which provides insulation and can also provide structural as well as other properties for the panels. In that regard, hollow panels have been filled with a foamable mixture to create a foam filled or foam core structure panel having a fiber reinforced plastic skin.

Another method of making a composite sandwich structure by pultrusion of a skin of liquid resin and reinforcement materials on the surface of a preformed foam core is disclosed in U.S. Pat. No. 5,286,320 which is incorporated herein by reference. The resulting contiguous structure is cut into desired lengths to form corresponding sized building panels.

While the resulting panels have a good R-value, there are a large number of applications that would benefit from even higher R-value insulation. For example, refrigerated shipping containers, reefers, walk-in coolers, refrigerators, freezers and the like. Many of these applications would prefer to utilize a modular panel if panels having sufficiently high R-values were available.

Accordingly, there is a need for an improved insulating modular panel for satisfying these needs in industry. Preferably, such panels would incorporate intermating members into their sides to facilitate their interconnection with one another and hence construction using the panels.

SUMMARY OF THE INVENTION

This need is met by the invention of the present application wherein improved insulating modular panels are manufactured to incorporate into each insulating modular panel at least one vacuum insulation panel. Vacuum insulation panels are conveyed seriatim toward a pultrusion/extrusion die which ultimately produces the insulating modular panels as a continuous block. Joint spacings or gaps between adjacent vacuum insulation panels and sides of the vacuum panels are filled with foam or preformed filler material to form a substantially continuous inner core which has substantially continuous side edges. Reinforcement material is applied to the inner core. The reinforcement material can be impregnated with resin prior to its application to the inner core or resin may be injected into the pultrusion/extrusion die. In either event, a continuous elongated block of insulating modular panels emerges from the pultrusion/extrusion die. The continuous elongated block is severed at joint spacings or gaps between adjacent vacuum insulation panels to form insulating modular panels of desired sizes from the block. Preferably, the sides of the insulating modular panels are formed to define intermating members which engage one another to facilitate construction using the insulating modular panels.

In accordance with one aspect of the present invention, a method of producing insulating modular panels comprises the steps of: conveying vacuum insulation panels seriatim toward a forming die; filling joint spacings between adjacent vacuum insulation panels to form a substantially continuous inner core including the vacuum insulation panels; filling edges of the vacuum insulation panels to form substantially continuous side edges on the substantially continuous inner core; impregnating fiber reinforcement materials with resin; arranging impregnated fiber reinforcement materials on the outer surface of the substantially continuous inner core to form a composite; moving the composite through the forming die to form the composite into a continuous elongated block of insulating modular panels; and, severing the continuous elongated block of insulating modular panels at selected filled joint spacings to form insulating modular panels of at least one size.

In accordance with another aspect of the present invention, a method of producing insulating modular panels comprises the steps of: conveying vacuum insulation panels seriatim toward a forming die; filling joint spacings between adjacent vacuum insulation panels to form a substantially continuous inner core including the vacuum insulation panels; filling edges of the vacuum insulation panels to form substantially continuous side edges on the substantially continuous inner core; arranging fiber reinforcement materials on the outer surface of the substantially continuous inner core to form a composite; impregnating fiber reinforcement materials with resin; moving the composite through the forming die to produce a continuous elongated block of insulating modular panels; and, severing the continuous elongated block of insulating modular panels at selected filled joint spacings to form insulating modular panels of at least one size.

In one embodiment, the steps of filling joint spacings between adjacent vacuum insulation panels and filling edges of the vacuum insulation panels comprises the step of passing the vacuum insulation panels through a die for foam filling the joint spacings and the edges. To facilitate assembly of insulating modular panels, the method may further comprise the step of forming intermating members on opposite sides of the insulating modular panels. Dependent upon the application, the vacuum insulation panels may be coated with a primer or a release agent or film.

In another embodiment, the step of filling joint spacings between adjacent vacuum insulation panels comprises placing preformed joint inserts, made for example of fiberglass wool board, into the joint spacings. Similarly, the step of filling edges of the vacuum insulation panels may comprise the step of placing preformed edge inserts along the edges of the vacuum insulation panels with the preformed edge inserts being formed for example of fiberglass wool board.

The step of impregnating fiber reinforcement materials may comprise the steps of: impregnating reinforcement materials above the substantially continuous inner core with resin; impregnating reinforcement materials below the substantially continuous inner core with resin; applying impregnated reinforcement materials to an upper surface of the substantially continuous core; and, applying impregnated reinforcement materials to a lower surface of the substantially continuous core.

Preferably, the method further comprises the step of folding the impregnated reinforcement materials to cover sides of the substantially continuous core. The step of folding the impregnated reinforcing materials to cover sides of substantially continuous core may comprise the steps of:

folding impregnated reinforcement materials applied to the lower surface of substantially continuous core upward over the sides of the substantially continuous core; and, folding impregnated reinforcement materials applied to the upper surface of substantially continuous core downward over the sides of the substantially continuous core. The steps of folding impregnated reinforcement material upward and downward may further comprise the step of overlapping the reinforcement material on the sides of the substantially continuous panel.

In accordance with yet another aspect of the present invention, an insulating modular panel comprises at least one vacuum insulation panel, and a stably dimensioned outer protective shell covering the at least one insulated panel. The at least one vacuum insulated panel has an upper surface, a lower surface, a front edge, a rear edge and side edges, and further comprises filler material along the front edge, the rear edge and the side edges. Preferably, the outer protective shell comprises a fiber reinforced plastic formed to the at least one vacuum insulated panel and filler material, the fiber reinforced plastic covering at least the upper surface, the lower surface and the filler material along the side edges of the panel. To facilitate interconnection of insulating modular panels to one another, the side edges of the insulating modular panels are formed to define members which intermate with one another. To improve the insulation provided by the insulating modular panels, preferably the members include insulation. The front edge and the rear edge of the insulating modular panels are defined by the filler material since the individual insulating modular panels are severed from the continuous elongated block of insulating modular panels at selected filled joint spacings to form insulating modular panels of at least one size.

It is thus an object of the present invention to provide improved insulating modular panels by incorporating one or more vacuum insulation panels into each insulating modular panel; to provide improved insulating modular panels incorporating one or more vacuum insulation panels into each insulating modular panel and forming side edges of the panels to include intermating members for interconnecting insulating modular panels to one another; and, to provide improved insulating modular panels by a pultrusion/extrusion process and incorporating one or more vacuum insulation panels into each insulating modular panel.

Other objects and advantages of the invention will be apparent from the following description, the accompanying drawings and the appended claims.

BRIEF DESCRIPTION OF THE DRAWINGS

FIG. 4 is a perspective end view of a generally rectangular insulating modular panel of the present invention;

FIG. 5 schematically illustrates, in elevation, interconnection of two of the insulating modular panels of FIG. 4;

FIG. 6 is a perspective end view of an insulating modular panel having intermating members on opposite sides of the panel;

FIG. 7 schematically illustrates, in elevation, interconnection of two of the insulating modular panels of FIG. 6;

DETAILED DESCRIPTION OF THE INVENTION

Figure 1:
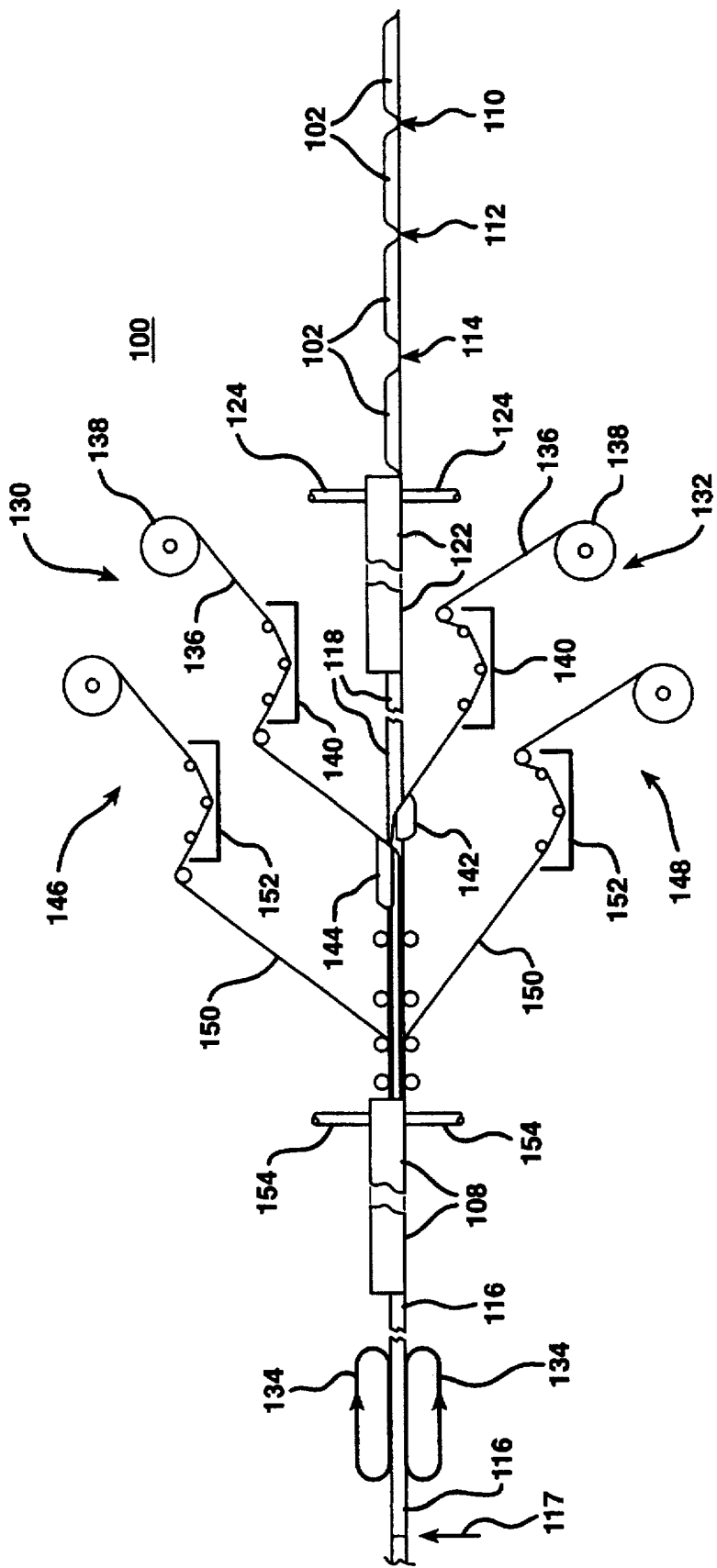
FIG. 1 is a schematic view, in elevation, of apparatus for making insulating modular panels including vacuum insulation panels in accordance with the present invention.

The invention of the present application will now be described with reference to the drawing figures wherein FIG. 1 schematically illustrates, in elevation, apparatus 100 for making insulating modular panels of the present application as illustrated in FIGS. 4–15. The insulating modular panels each incorporate at least one vacuum insulation panel. Vacuum insulation panels are well known in the art and typically consist of a thermally insulating media contained within a sealed enclosure. The enclosure is evacuated to created a vacuum in the enclosure and thereby reduce heat transfer through the panel.

Figure 2:
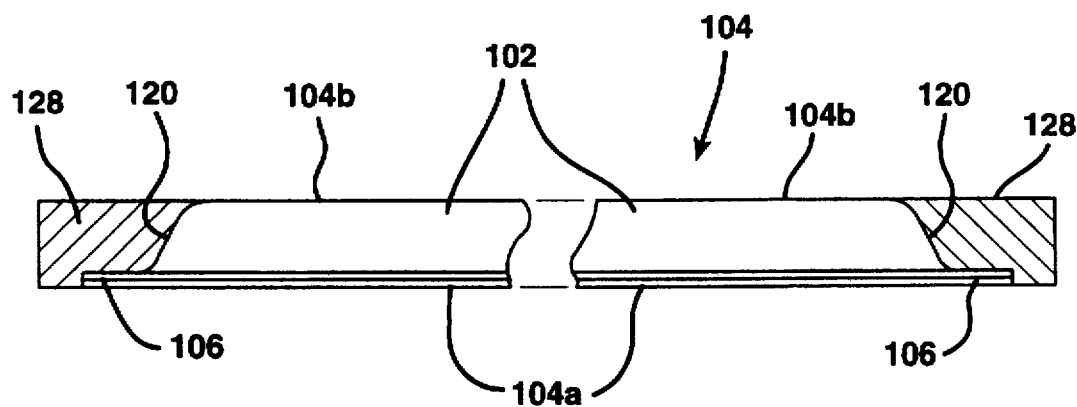
FIGS. 2, 2A and 2B illustrate fill strips for filling edges of vacuum insulation panels to form continuous side edges prior to pultrusion.

With reference to FIG. 2, a vacuum insulation panel 102 is illustrated. In FIG. 2, the vacuum insulation panel 102 is inverted, i.e. the top of the panel is down and the bottom of the panel is up, since this is the orientation of vacuum insulation panels illustrated for manufacturing the insulating modular panels of the present application. The vacuum insulation panel 102 comprises a jacket 104 including a top 104a and a bottom 104b. The jacket 104 is formed of a metal having a low coefficient of thermal conductivity and low air permeability, for example 3 mil stainless steel. The bottom 104b is formed into a pan shape having a cavity for receiving an insulating media and a flat flange 106 extending around its periphery. It is important that the flange 106 be flat, unthinned and wrinkle free to permit a hermetic seal with the top 104a. The top 104a, which is illustrated as being flat but also may be pan shaped or otherwise configured, is welded to the flange 106 to create a hermetic seal either using laser welding or a roll resistance seam welding process.

A number of other vacuum insulation panel structures are known in the art and also can be used in the present invention. Additional information regarding vacuum insulation panel structures and their manufacture can be obtained by reviewing U.S. Pat. No. 5,330,816 and U.S. patent application Ser. No. 08/217,163 which was filed on Jul. 7, 1994, now U.S. Pat. No. 5,484,482 and is entitled VACUUM INSULATION PANEL AND METHOD FOR MANUFACTURING both of which are assigned to the same assignee as the present application and are incorporated herein by reference.

In any event, as illustrated in FIG. 1, vacuum insulation panels 102 are conveyed seriatim toward a pultrusion forming die 108. While the present invention is being described with reference to a pultrusion operation, formation of insulating modular panels of the present invention by means of extrusion is also contemplated. Whichever process is used, the forming die must be shaped to ensure that pressures within the die do not become so high as to damage the vacuum insulation panels 102.

For a basic rectangular insulating modular panel as shown in FIGS. 4 and 5, a generally rectangular forming die is currently contemplated. The formation of this forming die as well as the more complex dies used for the insulating modular panels of FIGS. 6–15 are well within the skill in the art of pultrusion/extrusion and will not be described in detail herein. Preheating of materials, heating of dies, cooling of dies, material injection into dies and the like are also well known in the art and will not be described in detail herein. For additional information regarding pultrusion dies, previously referenced U.S. Pat. No. 5,286,320 should be reviewed.

Adjacent vacuum insulation panels 102 are separated from one another by joint spacings 110, 112, 114. As illustrated, the joint spacings 110, 112 are approximately the same size and smaller than the joint spacing 114. The larger size of the joint spacing 114 may be preferred at locations where insulating modular panels are to be severed from a continuous elongated block 116 of insulating modular panels which emerges from the pultrusion forming die 108 as indicated by the arrow 117. The smaller size of the joint spacings 110, 112 may be preferred for internal joint spacings when insulating modular panels incorporate more than one of the vacuum insulation panels 102. Such smaller joint spacings decrease the sizes of the sections of reduced insulation which occur between adjacent vacuum insulation panels.

The joint spacings 110, 112, 114 between adjacent vacuum insulation panels 102 are filled to form a substantially continuous inner core 118 including the vacuum insulation panels 102. Also, side edges 120 of the vacuum insulation panels 102 are filled to form substantially continuous side edges on the substantially continuous inner core 118, see FIG. 2. Filling of the joint spacings 110, 112, 114 between adjacent vacuum insulation panels 102 and side edges 120 can be performed in a number of ways.

For example, on their way to the pultrusion forming die 108, the vacuum insulation panels 102 can be passed through a foaming die 122 with foam injected into the die 122 via ports connected to foam introduction tubes 124. This foam-filling operation results in the vacuum insulation panels 102 being covered with foam to some extent over their entire outside surfaces. Of course, the joint spacings between adjacent vacuum insulation panels 102, such as the joint spacings 110, 112, 114, and the side edges 120, are filled as noted above.

Figure 2A:
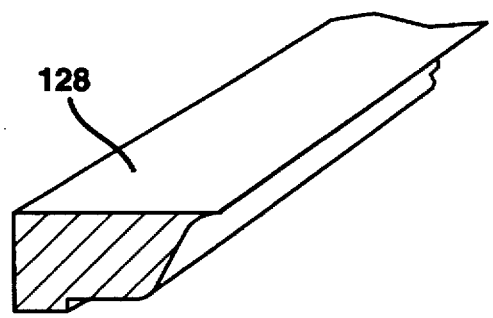
Figure 2B:
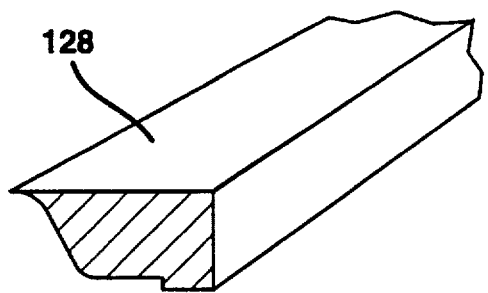
Figure 3:
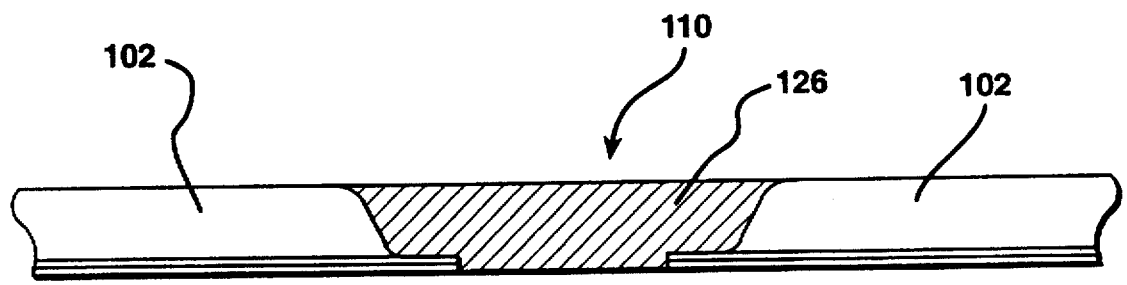
FIGS. 3 and 3A illustrate fill strips for filling joint spacings between adjacent vacuum insulation panels to form a substantially continuous inner core including the vacuum insulation panels prior to pultrusion.
Figure 3A:
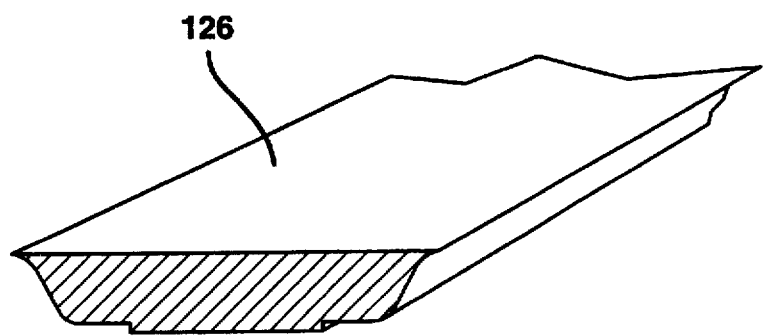

Alternately or in addition to the noted foaming operation using the foaming die 122, filler strips or preformed joint inserts 126 may be placed into the joint spacings between adjacent vacuum insulation panels 102, such as the joint spacings 110, 112, 114, see FIGS. 3 and 3A. Similarly, filler strips or preformed edge inserts 128 may be placed along the side edges 120 of the vacuum insulation panels 102, see FIGS. 2, 2A and 2B. The preformed joint inserts 126 and preformed edge inserts 128 are formed to engage one another to form the substantially continuous inner core 118 including the vacuum insulation panels 102.

Preferably, the preformed joint inserts 126 and preformed edge inserts 128 are glued or otherwise appropriately secured to the vacuum insulation panels 102 and can be trimmed to size if necessary or desired for a given forming operation. The preformed joint inserts 126 and preformed edge inserts 128 can be formed from a wide variety of materials including 6 to 8 pound per cubic foot (pcf) fiberglass wool board, wood and any one of a large number of foams. Other appropriate materials will be suggested to those skilled in the art in view of this disclosure.

However formed, the continuous inner core 118 including the vacuum insulation panels 102 is next conveyed through reinforcement stations 130, 132 where reinforcing material is applied to the continuous inner core 118 prior to being moved through the forming die or, as illustrated, pulled through the pultrusion forming die 108 by an appropriate traction or pulling device, such as a traction drive 134. A portion of the illustrated embodiment shows fiber reinforcement materials 136 extending from appropriate storage stations 138 and being passed through resin impregnation baths 140 prior to being arranged on the outer surface of the substantially continuous inner core 118 to form a composite which is passed through the pultrusion forming die 108 to form the composite into a continuous elongated block of insulating modular panels.

The reinforcement materials 136 preferably comprise a combination of individual reinforcements including, for example: continuous roving, such as Owens Corning (OC) 366 roving; double bias mat with chopped strand mat, such as OC 2404 mat; high loft wet process mat, such as OC 4500; and, outermost, surface veil which provides a smooth outer surface to the continuous elongated block 116 of insulating modular panels which emerges from the pultrusion forming die 108. While a number of resins can be used in the present invention, the resin contained in the resin impregnation baths 140 can comprise OC E606 polyester resin.

After the reinforcement materials 136 are applied to the substantially continuous inner core 118, they are folded by forming shoes 142, 144 to cover the sides of the inner core 118. As illustrated, the reinforcement materials 136 on the lower surface of the inner core 118 are initially folded upward over the sides of the inner core 118. The reinforcement materials 136 on the upper surface of the inner core 118 are then folded downward over the sides of the inner core 118 and the previously upwardly folded reinforcement materials. Of course, the reinforcement materials 136 on the upper surface of the inner core 118 could be folded downward first with the reinforcement materials 136 on the lower surface then being folded upward over the sides and the previously downward folded reinforcement materials 136.

As illustrated, the apparatus 100 includes supplemental reinforcement stations 146, 148 where supplemental reinforcing materials 150 are applied to the continuous inner core 118 prior to being moved through the forming die 108. The supplemental reinforcing materials 150 extend beyond the side edges of the continuous inner core 118 to provide reinforcement for intermating members formed on opposite sides of the insulating modular panels as will be described with reference to FIGS. 6–15. As illustrated, the supplemental reinforcement materials 150 also pass through resin impregnation baths 152 which are similar to the baths 140 and would typically utilize the same resin.

While the resin impregnation baths 140, 152 are illustrated in FIG. 1, it is to be understood that reinforcement materials can be applied to the continuous inner core 118 in a dry state with resin being injected into ports in the pultrusion forming die 108 via resin injection tubes 154. It is also noted that injection of foam to fill the joint spacings 110, 112, 114 and the side edges 120 can be performed in the pultrusion die 108 immediately before the injection of resin and such foam-filling is contemplated for the present invention. The use of one or both of the resin impregnation baths 140, 152, the injection of resin into the pultrusion forming die 108 and/or the injection of foam into the pultrusion forming die 108 is decided based on materials used for making the insulating modular panels and the ease of manufacture in each instance.

The supplemental reinforcement materials 150 may comprise materials similar to the reinforcement materials 136. It is to be understood that the make-up of the reinforcement materials 136 and the supplemental reinforcement materials 150 can vary overall and from one another dependent upon the application for which an insulating modular panel is being manufactured. However, the reinforcement materials should be of sufficient volume and resiliency to accommodate variations which occur in the dimensions of the vacuum insulation panels 102 and preferably to permit further relaxed tolerances on the dimensions of the vacuum insulation panels. Other reinforcement materials will be apparent to those skilled in the art as well in view of this disclosure.

It may be desirable to coat or otherwise preform materials on the outer surfaces of the vacuum insulation panels 102 prior to incorporation into the insulating modular panels. In particular, in some applications where the insulating modular panels will encounter little stress, it may be preferred to provide a primer coat on the vacuum insulation panels 102 for good adhesion of the fiber reinforced plastic (FRP) with the vacuum insulation panels 102. On the other hand, in high stress applications, it may be preferred to apply a release agent or film to the vacuum insulation panels 102 such that there is little transfer of stress to the vacuum insulation panels 102 which could otherwise lead to failures of their skins or welds. These as well as other coating materials can be determined on an application by application basis and whatever the method of their application will be referred to generically as "forming" a coating on the vacuum insulation panels 102.

With the foregoing description of manufacturing insulating modular panels as background, a variety of resulting insulating modular panels illustrated in FIGS. 4-15 will now be described. A generally rectangular insulating modular panel 200 of the present invention is illustrated in FIG. 4. The panel 200 includes at least one vacuum insulation panel 102 having filler material 202 at least along its side edges and, as illustrated, a small amount of filler material above and below the at least one vacuum insulation panel 102. The stably dimensioned outer shell of the insulating modular panel 200 comprises a fiber reinforced plastic shell 204 which is formed as described above.

While the vacuum insulating panel 102 is shown as being at the end face of the panel 200 for ease of illustration and description, it is to be understood that filler material previously inserted into joint spacings between adjacent vacuum insulation panels 102 would actually define the end face. This is because the filler material is severed to separate individual insulating modular panels from the continuous elongated block 116 of insulating modular panels. This illustration convention will be utilized through out FIGS. 4-15 without further reference.

Two of the insulating modular panels 200 can be abutted to one another for installation or can be interconnected by means of an I-shaped interconnecting channel 206. The I-shaped interconnecting channel 206 can be sized to receive the panels 200 with an interference fit or can be secured to the panels 200 with an appropriate adhesive for a given application.

A second embodiment of an insulating modular panel 210 is illustrated in FIGS. 6 and 7. In addition to the generally rectangular central portion of the panel 210, the side edges of the panel 210 are formed to define members 212 which intermate with one another to facilitate interconnecting the panels 210 to one another by means of the members 212.

In the second embodiment of FIGS. 6 and 7, the intermating members 212 are formed by an extension 214 of the upper surface on one side of the panel 210 and an extension 216 of the lower surface on the other side of the panel 210. Reinforcing tubular ribs 218 are formed on the lower side of the extension 214 and the upper side of the extension 216 with the tubular ribs 218 being sized to intermate with one another as shown in FIG. 7. The panels 210 can be secured to one another by means of adhesive or fasteners (not shown) which extend through the extensions 214, 216. Preferably, the tubular ribs 218, which define openings extending entirely therethrough, are filled with insulating material which can be inserted after manufacture of the panel 210 or during manufacture by means of a floating mandrel as will be apparent to those skilled in the art of pultrusion/extrusion.

Figure 8:
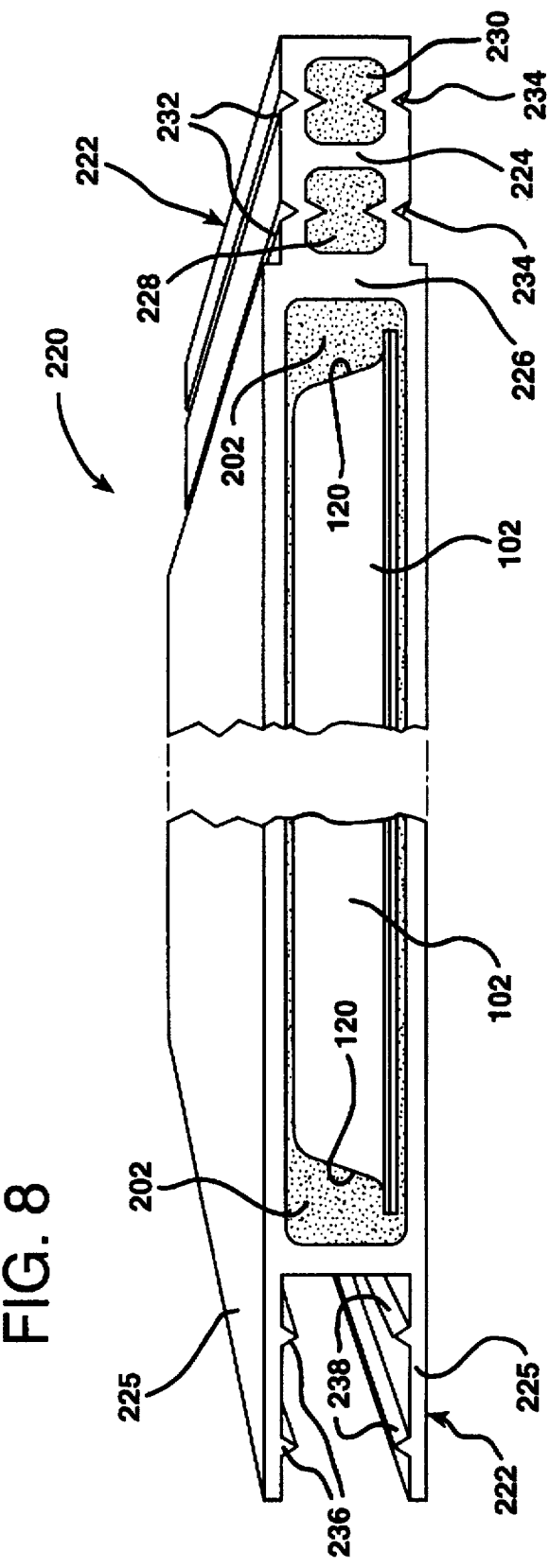
FIG. 8 is a perspective end view of an insulating modular panel having intermating members on opposite sides of the panel.
Figure 9:
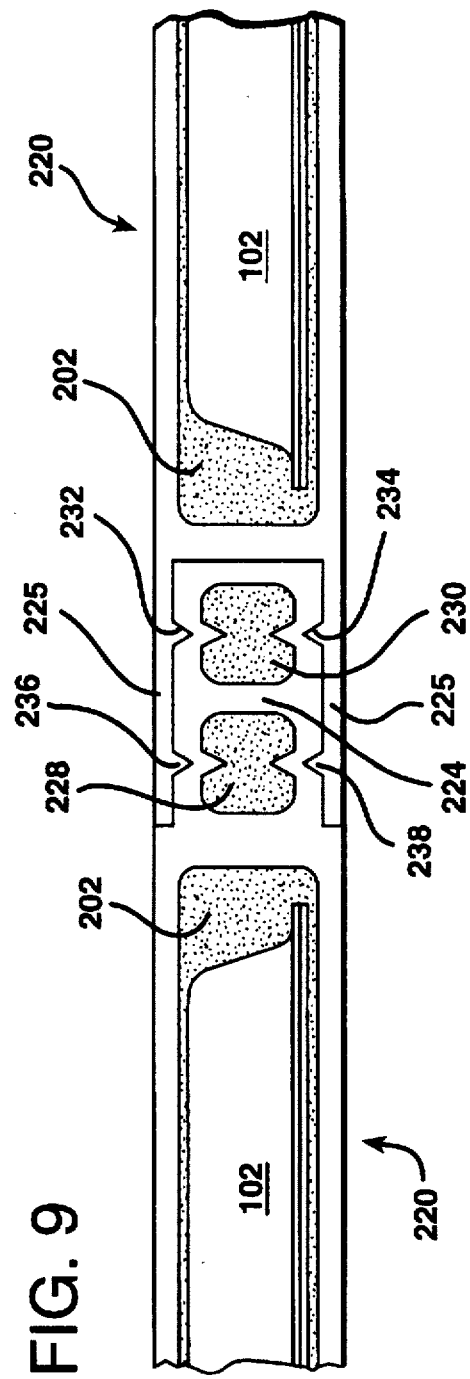
FIG. 9 schematically illustrates, in elevation, interconnection of two of the insulating modular panels of FIG. 8.

A third embodiment of an insulating panel 220 is illustrated in FIGS. 8 and 9. In addition to the generally rectangular central portion of the panel 220, the side edges of the panel 220 are formed to define members 222 which intermate with one another to facilitate interconnecting the panels 210 to one another by means of the members 212.

In the third embodiment of FIGS. 8 and 9, the intermating members 222 comprise a rib 224 formed at one end and extending from the central portion of a sidewall 226 at the one end, and intermating extensions 225 of the upper and lower surfaces of the panel 220. The rib 224 defines two tubular openings 228, 230 which extend entirely through the rib 224. Two V-shaped slots 232 are formed on the upper surface of the rib 224 and are generally centered on the tubular openings 228, 230. Two V-shaped slots 234 are also formed on the lower surface of the rib 224 and are also generally centered on the tubular openings 228, 230.

The extensions 225 define two pairs of inwardly extending V-shaped ribs 236 and 238 which are received within the V-shaped slots 232, 234, respectively when the two intermating members 222 are interconnected to one another as shown in FIG. 9. Preferably, the tubular openings 228, 230 are filled with insulating material which can be inserted after manufacture of the panel 220 or during manufacture by means of floating mandrels as will be apparent to those skilled in the art of pultrusion/extrusion. The panels 220 can be secured to one another by means of adhesive or the rib 224 and the extensions 225 can be sized for a frictional engagement. If necessary, appropriate fasteners can also be extended through interengaged intermating members 222.

Figure 10:
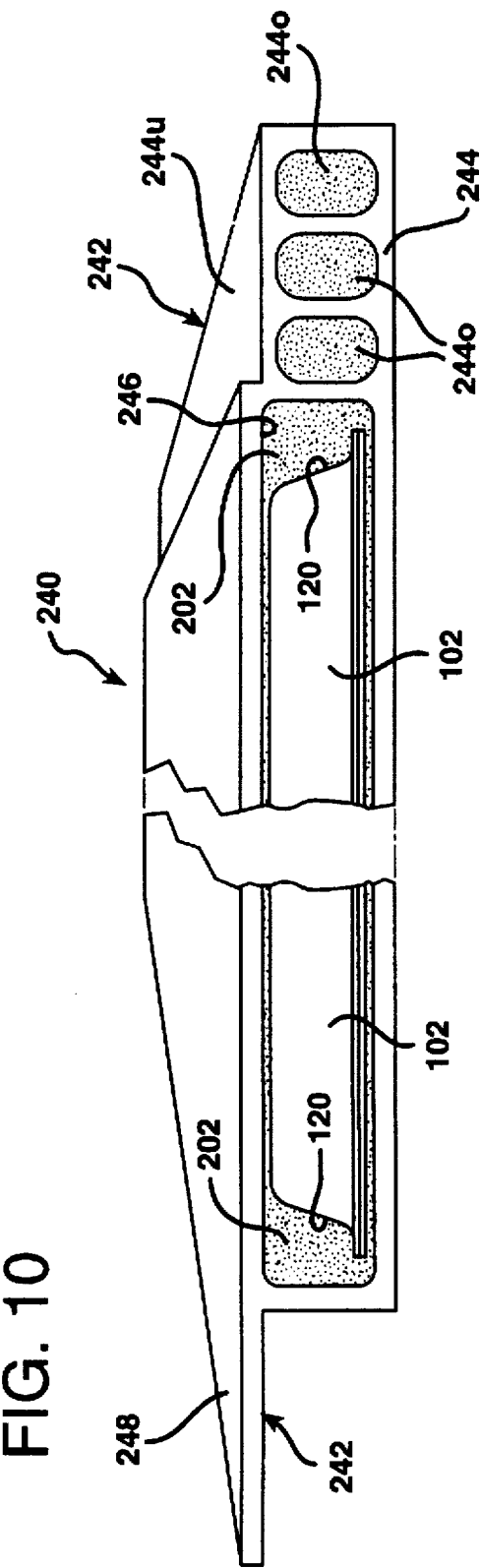
FIG. 10 is a perspective end view of an insulating modular panel having intermating members on opposite sides of the panel.
Figure 11:
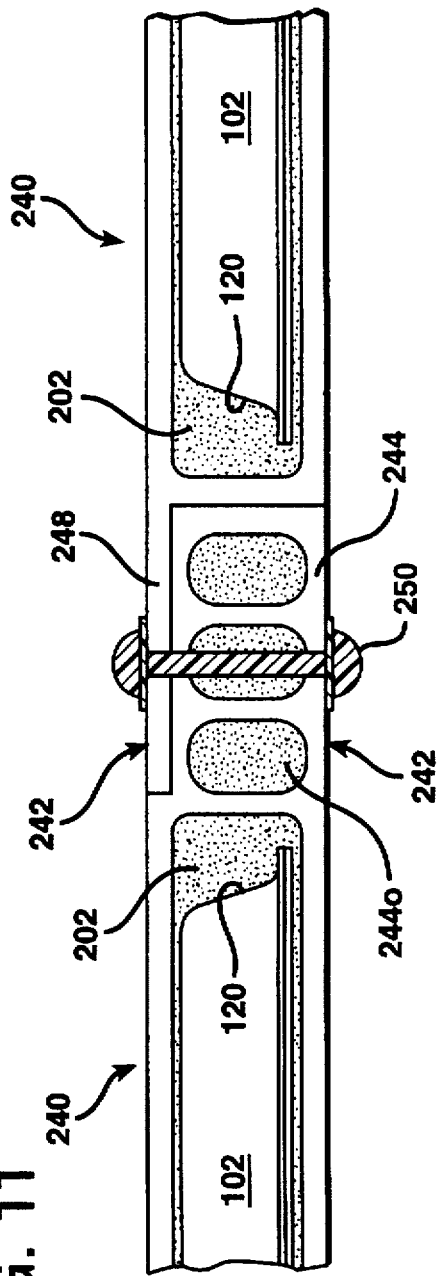
FIG. 11 schematically illustrates, in elevation, interconnection of two of the insulating modular panels of FIG. 10.

A fourth embodiment of an insulating panel 240 is illustrated in FIGS. 10 and 11. In addition to the generally rectangular central portion of the panel 240, the side edges of the panel 240 are formed to define members 242 which intermate with one another to facilitate interconnecting the panels 240 to one another by means of the members 242.

In the fourth embodiment of FIGS. 10 and 11, one of the intermating members 242 comprises an enlarged extension 244 which extends from an area ranging from the lower surface of the insulating panel 240 approximately to the inner sidewall 246 of the upper wall of the insulating panel 240. The enlarged extension 244, as illustrated, defines three tubular openings 244o which extend entirely therethrough. The other of the intermating members 242 comprises an extension 248 of the upper surface of the insulating panel 240 which is sized to be received on an upper surface 244u of the enlarged extension 244.

Two of the panels 240 are shown as being secured together via the intermating members 242 in FIG. 11. The panels 240 can be secured together by means of an appropriate adhesive, by a thermoplastic bolt or rivet 250, or otherwise. Preferably, the tubular openings 244o are filled with insulating material which can be inserted after manufacture of the panel 240 or during manufacture by means of floating mandrels as will be apparent to those skilled in the art of pultrusion/extrusion.

Figure 12:
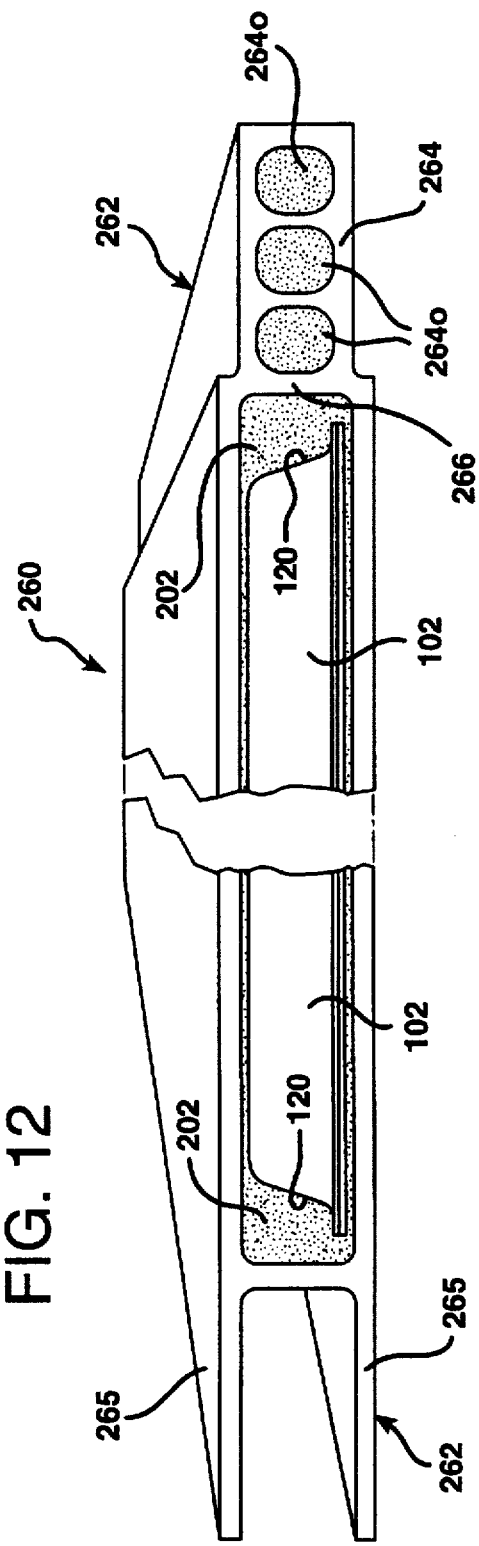
FIG. 12 is a perspective end view of an insulating modular panel having intermating members on opposite sides of the panel.
Figure 13:
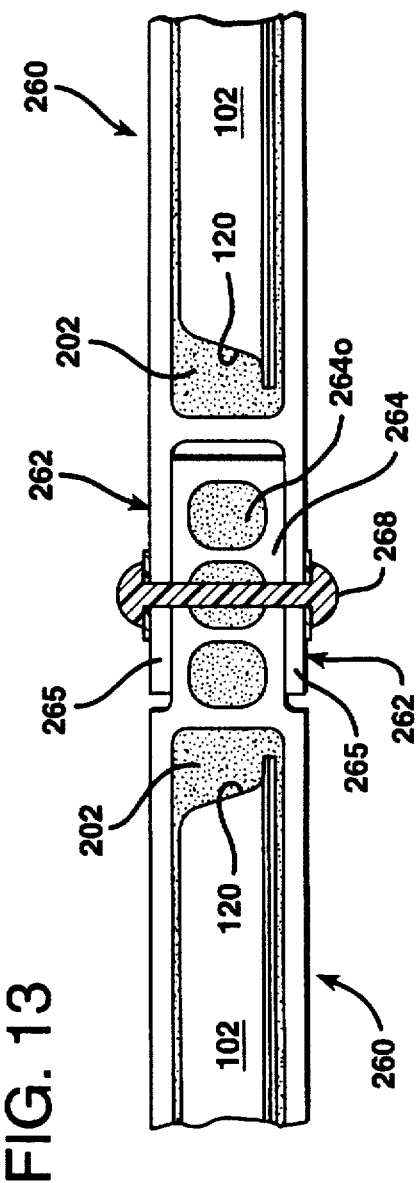
FIG. 13 schematically illustrates, in elevation, interconnection of two of the insulating modular panels of FIG. 12.

A fifth embodiment of an insulating panel 260 is illustrated in FIGS. 12 and 13. In addition to the generally rectangular central portion of the panel 260, the side edges of the panel 260 are formed to define members 262 which intermate with one another to facilitate interconnecting the panels 260 to one another by means of the members 262.

In the fifth embodiment of FIGS. 12 and 13, the intermating members 262 comprise a rib 264 formed at one end and extending from the central portion of a sidewall 266 at the one end, and intermating extensions 265 of the upper and lower surfaces of the panel 260. The rib 264 defines three tubular openings 264o which extend entirely through the rib 264.

The extensions 265 receive the rib 264 therebetween when the two intermating members 222 are interconnected to one another as shown in FIG. 13. Preferably, the tubular openings 264o are filled with insulating material which can be inserted after manufacture of the panel 260 or during manufacture by means of floating mandrels as will be apparent to those skilled in the art of pultrusion/extrusion. The panels 260 can be secured together by means of an appropriate adhesive, by a thermoplastic bolt or rivet 268, or otherwise.

Figure 14:
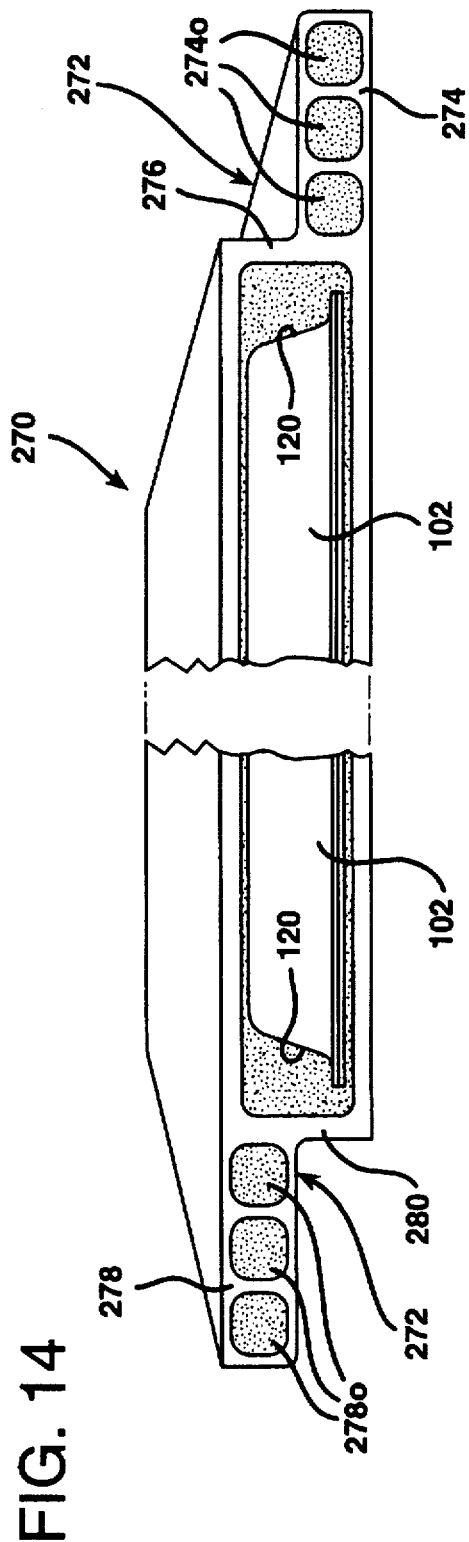
FIG. 14 is a perspective end view of an insulating modular panel having intermating members on opposite sides of the panel.
Figure 15:
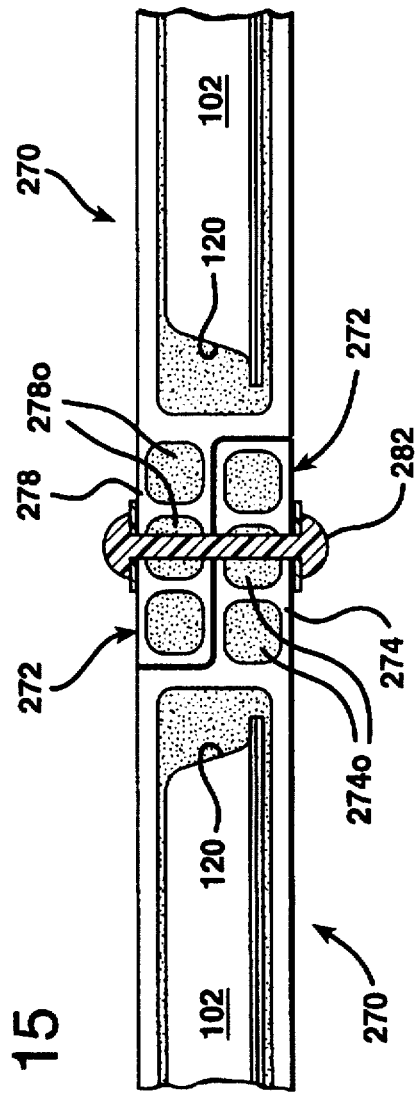
FIG. 15 schematically illustrates in elevation, interconnection of two of the insulating modular panels of FIG. 14.

A sixth embodiment of an insulating panel 270 is illustrated in FIGS. 14 and 15. In addition to the generally rectangular central portion of the panel 270, the side edges of the panel 270 are formed to define members 272 which intermate with one another to facilitate interconnecting the panels 270 to one another by means of the members 272.

In the sixth embodiment of FIGS. 14 and 15, one of the intermating members 272 comprises an enlarged extension 274 which extends from an area ranging from the lower surface of the insulating panel 270 approximately to the center of one sidewall 276 of the insulating panel 270. The enlarged extension 274, as illustrated, defines three tubular openings 274o which extend entirely therethrough. The other of the intermating members 272 comprises an enlarged extension 278 which extends from an area ranging from the upper surface of the insulating panel 270 approximately to the center of the other sidewall 280 of the insulating panel 270. The enlarged extension 278, as illustrated, defines three tubular openings 278o which extend entirely therethrough. Accordingly, the two enlarged extensions 274, 278 are sized to receive one another in overlapping relation.

Two of the panels 270 are shown as being secured together via the intermating members 272 in FIG. 15. The panels 270 can be secured together by means of an appropriate adhesive, by a thermoplastic bolt or rivet 282, or otherwise. Preferably, the tubular openings 274o, 278o are filled with insulating material which can be inserted after manufacture of the panel 270 or during manufacture by means of floating mandrels as will be apparent to those skilled in the art of pultrusion/extrusion.

Having thus described the invention of the present application in detail and by reference to preferred embodiments thereof, it will be apparent that modifications and variations are possible without departing from the scope of the invention defined in the appended claims.

I claim:

1. An insulating modular panel comprising:
   at least one vacuum insulation panel having an upper surface, a lower surface, a front edge, a rear edge and side edges;
   filler material along said front edge, said rear edge and said side edges of said at least one vacuum insulation panel; and
   a stably dimensioned outer protective shell comprising a fiber reinforced plastic formed to said at least one vacuum insulation panel and said filler material, said fiber reinforced plastic covering said upper surface, said lower surface and said filler material along said side edges of said at least one vacuum insulation panel, a front edge and a rear edge of said insulting modular panel comprising said filler material.

2. An insulating modular panel as claimed in claim 1 wherein side edges of said insulating modular panel are formed to define members which intermate with one another to interconnect insulating modular panels to one another by means of said members.

3. An insulating modular panel as claimed in claim 2 wherein at least one of said members include insulation inserted thereinto.

4. An insulating modular panel as claimed in claim 2 wherein said members interconnect insulating modular panels to one another so that the interconnected insulating modular panels have upper surfaces thereof positioned substantially within a first plane and lower surfaces thereof positioned substantially within a second plane, said first and second planes being parallel to and separated from one another.

5. An insulating modular panel as claimed in claim 2 wherein said members, when intermated with one another, are sized to substantially fill spacing between insulating modules interconnected by said intermated members.

6. An insulating modular panel as claimed in claim 5 wherein said members include insulation.

7. An insulating modular panel as claimed in claim 5 wherein at least one of said members comprises at least one tubular rib.

8. An insulating modular panel as claimed in claim 7 wherein said at least one tubular rib is filled with insulating material.

9. An insulating modular panel as claimed in claim 7 wherein said at least one tubular rib defines an opening extending entirely therethrough, said opening being filled with insulating material.

10. An insulating modular panel as claimed in claim 1 wherein said side edges of said insulating modular panel are formed to define members which intermate with one another to facilitate interconnecting insulating modular panels to one another by means of said members which are formed so that insulating modular panels interconnected by said members form an expanded insulting modular panel having a substantially continuous upper surface and a substantially continuous lower surface.

* * * * *

UNITED STATES PATENT AND TRADEMARK OFFICE
CERTIFICATE OF CORRECTION

PATENT NO. : 5,756,179
DATED : May 26, 1998
INVENTOR(S) : Ralph B. Jutte

It is certified that error appears in the above-identified patent and that said Letters Patent is hereby corrected as shown below:

In Claim 10, Line 7, delete insulting, and insert -insulating-.

Signed and Sealed this

Thirteenth Day of October 1998

*Attest:*

BRUCE LEHMAN

*Attesting Officer*      Commissioner of Patents and Trademarks